United States Patent [19]

Hanlon

[11] 3,882,536

[45] *May 6, 1975

[54] COLOR INFORMATION ON BLACK AND WHITE FILM

[75] Inventor: Thomas F. Hanlon, 337 Tremont Ave., Fort Lee, N.J. 07024

[*] Notice: The portion of the term of this patent subsequent to Feb. 6, 1990, has been disclaimed.

[22] Filed: Oct. 19, 1972

[21] Appl. No.: 299,126

Related U.S. Application Data

[63] Continuation-in-part of Ser. No. 84,570, Oct. 28, 1970, Pat. No. 3,715,461.

[30] Foreign Application Priority Data

Oct. 23, 1971 Germany ........................... 2152911

[52] U.S. Cl. .................................................. 358/44
[51] Int. Cl. ............................................ H04n 9/07
[58] Field of Search .................. 178/5.4 ST; 358/44

[56] References Cited

UNITED STATES PATENTS 2,892,883 6/1959 Jesty et al. ..................... 178/5.4 ST

*Primary Examiner*—Richard Murray
*Attorney, Agent, or Firm*—Cushman, Darby & Cushman

[57] ABSTRACT

A method and apparatus for recording and reading out programmed color information on black and white film and black and white film with such information coded thereon. In one embodiment, a line screen of filter having a number of sets of contiguous red, green and blue lines of differing width is placed atop a piece of black and white film to record a color coded image. After development, the film can be scanned and the color associated with a line being scanned ascertained and employed to operate an electron beam for producing the proper color or producing a laser beam of the proper color by the width of the scanned line. According to a further embodiment a line screen or filter is placed over a conventional television camera for producing a coded signal which is transmitted to a remote location, to be decoded and produce a color image.

6 Claims, 10 Drawing Figures

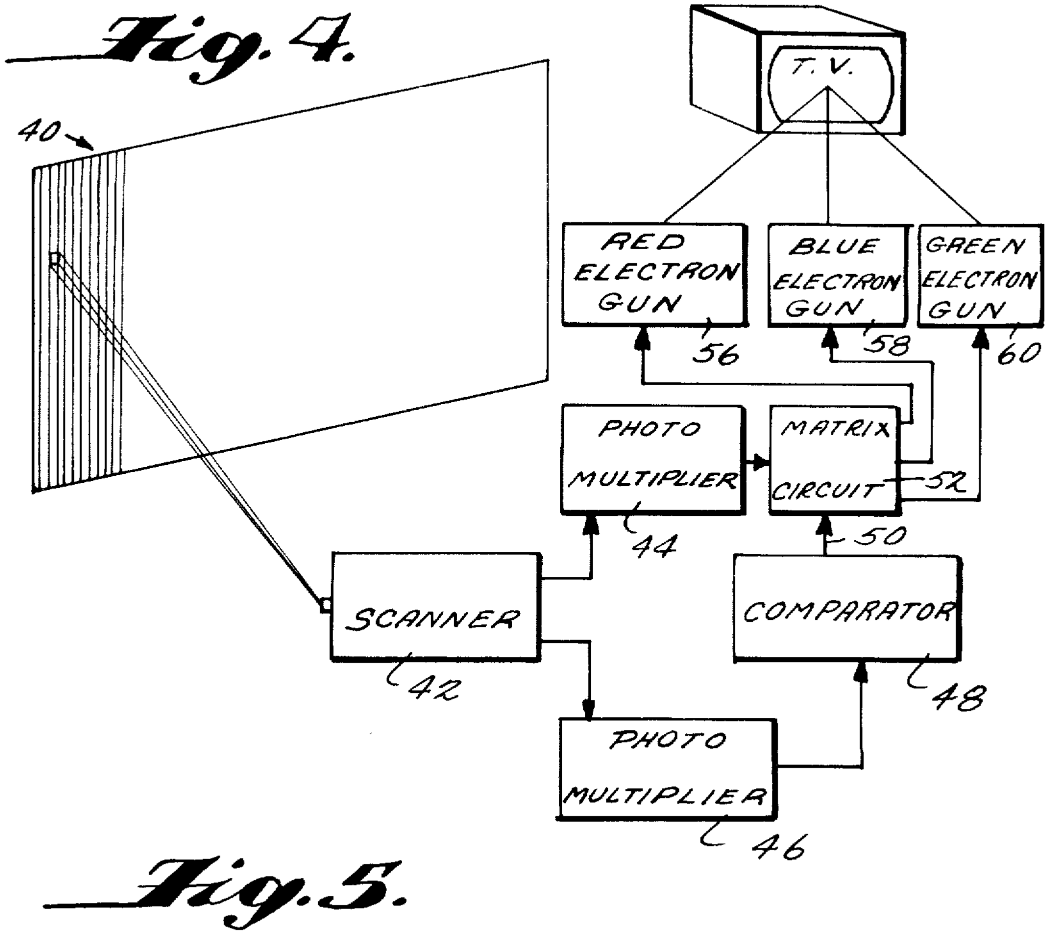
Fig. 4. (label inside the figure region)
Fig. 5.
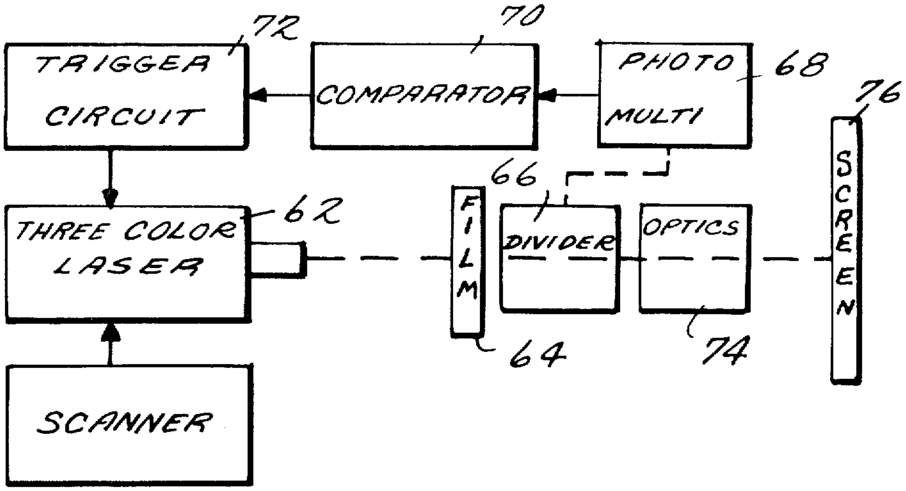

COLOR INFORMATION ON BLACK AND WHITE FILM

BRIEF DESCRIPTION OF THE PRIOR ART AND SUMMARY OF THE INVENTION

The invention is described in Document Disclosure 395. This application is a continuation-in-part of co-pending application Ser. No. 84,570 filed Oct. 28, 1970, now U.S. Pat. No. 3,715,461.

The invention relates to a method and apparatus for transmitting and receiving color television signals.

Many circumstances exist in which it is necessary or desirable to record information in the form of a pattern of light having at different points different densities and colors, for example, photographing or transmitting in color a picture of an object or scene. While color films are available which will produce a satisfactory reproduction of such a pattern in most instances, such film is expensive compared to common black and white film and may not produce a satisfactory reproduction for all applications. Accordingly, several different techniques have been developed for color coding information onto relatively inexpensive black and white film.

In one approach, termed the "line screen process," a line screen or filter comprising a large number of contiguous sets of red, green and blue line filters is disposed between the source of the light which forms the image of the pattern to be reproduced and conventional black and white film. The technique is particularly satisfactory with black and white film of the type known as Kalvar and described in the U.S. Pat. Nos. 3,032,414, 3,161,511, and 3,251,690, for example. To use such film, the original negative can be photographed through the color filters onto a color sensitive negative and a positive printed from this to Kalvar. By using an electronic vidicon or other similar tube which acts as the negative or positive and converts the color scanned to positive or negative black and white densities, direct recording to Kalvar can be done provided the receiving CRT has a P-16 phosphor (output light at 3850 angstroms) which is the light range to which Kalvar is sensitive. The red filters allow transmission of red light so that the portion of the film immediately below each of the red filters receives the red component of the incident light and these components accordingly, control the deposit of metallic silver or some other light absorbtion or light scattering medium on to the black and white film. The portions of the film directly beneath the green and blue filters are similarly exposed to the incident light with the green and blue components respectively. Accordingly, if the film is developed to produce a negative print and this printed to produce a positive print, mounting the positive print in exact registry with the line screen or filter results in a true color reproduction which can be viewed or used in the same fashion as any other photograph. If the number of sets of three-color filters per unit of length on the film is large enough, the discrete lines of red, green and blue colors will not be apparent and the photograph will appear to be continuous. This process is discussed further in Friedmen's HISTORY OF COLOR PHOTOGRAPHY, American Photography Publishing Co., 1944.

The primary difficulty with this approach is that it is extremely difficult to properly align the filter with the developed, positive print. If the film is improperly aligned with the filter or if the pattern of lines on the print becomes distorted during development with respect to the pattern on the filter, the reproduction is unsatisfactory for most purposes.

Another coding technique is described in the Takagi U.S. Pat. No. 3,591,709, in which filters having alternate stripes of white and another primary color are employed to generate frequency components which can be separated in the electrical signal which is produced by scanning the photograph. The use of white, however, precludes registering a print made with the original color since the white will contaminate color registration.

The present invention relates to a system of recording and reading out colored coded information on conventional black and white film or with a television camera and transmission system which is similar to the line screen process. In the embodiments of the invention discussed in detail below, the width of each of the three color filters of each set differs from the width of the other line filters of that set. Preferably, the red filter comprises 40 percent of the width of the set, the green filter 35 percent and the blue filter 25 percent. Because the width of each of the color lines on the filter, and on the film as well, varies from the widths of the lines of different color, the resulting black and white image on the film may be easily scanned by a flying spot scanner to generate electrical signals which can be easily analyzed to recognize the color of a line being scanned on the black and white film, and accordingly operate a device for reproducing a line of that color of the proper intensity on a screen or other viewing apparatus.

In one embodiment of the invention as described in detail below, black and white film produced in the manner discussed above with a plurality of sets of red, green and blue color lines each having differing widths is scanned by a flying spot scanner to generate electrical signals having a characteristic which varies with intensity of the light passing through or reflected from the portion of the film being scanned. This signal is transmitted to a comparator circuit which, by determining the width of a line which has just been scanned, ascertains the coded color of that line or the next line. The comparator circuit then actuates a red, blue or green electron gun accordingly, so that the electrical signals derived from the scanner cause the proper gun to produce a color line of the scanned intensity.

According to yet another embodiment of a line screen such as discussed above can be placed over the video input to a conventional television camera to produce coded signals which are then transmitted to remote television sets. A comparator circuit can be used to determine line width of the received signals, and hence color, and then actuate the associated electron beam. Alternately, the comparator can control a field sequential circuit which in turn operates a color modulator to produce a full color image.

According to another embodiment of the invention, a three-color laser which is capable of producing coherent light pulses of red, blue or green sequentially scans a film produced in the above manner. Electrical signals derived from light transmitted through or reflected from this film are passed to a comparator circuit which determines the color coded line being scanned and causes the laser to produce a pulse of the appropriate color of the line which then passes through the film and is projected onto a screen at the desired intensity.

According to a further embodiment of the invention, film produced in the above-mentioned manner is scanned by a laser flying spot scanner or cathode ray scanner to produce a diffraction pattern. Since each of the three color lines or stripes has a different width, the first order images of the lines or stripes will appear at different locations in space. Photomultiplier tubes or other devices, such as conventional television cameras can then be disposed at the locations, for example, where the first order red, green and blue images appear, respectively, to generate signals which can be applied, for example, to red, green and blue electron guns for producing a color picture on a conventional television screen or the like. Alternately, the signals can be employed to pulse a laser of the type which produces three colors as described above.

Many other objects and purposes of the invention will become clear from the following detailed description of the drawings.

BRIEF DESCRIPTION OF THE DRAWINGS

FIG. 4 shows a schematic block diagram of one embodiment of the invention for reading out color information coded on black and white film.

FIG. 5 shows a further embodiment of the invention for reproducing of a color coded pattern on black and white film.

DETAILED DESCRIPTION OF THE DRAWINGS

Figures 1, 2, 3:
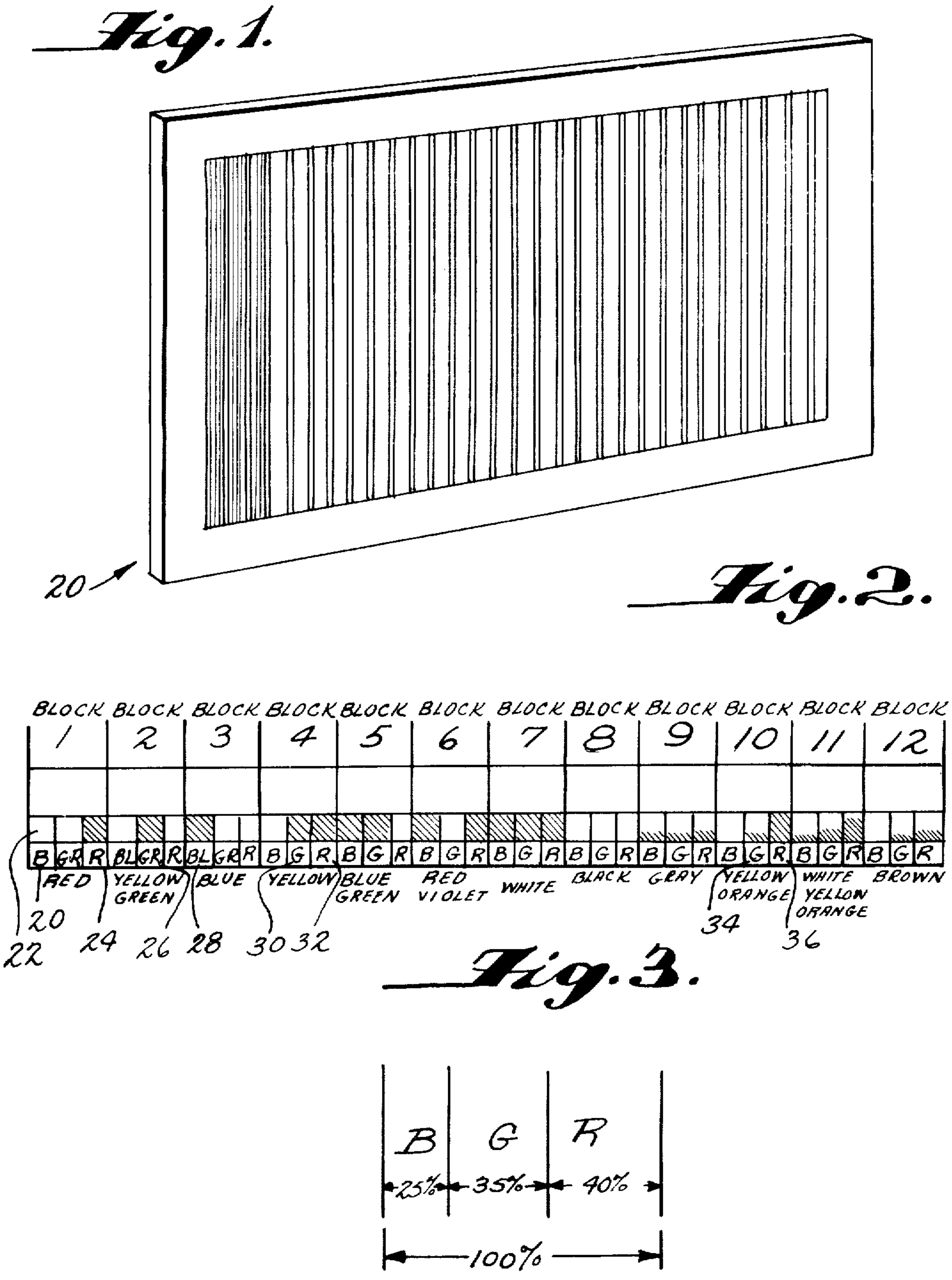
FIG. 1 shows a filter or line screen having a plurality of sets of red, green and blue line filters.
FIG. 2 shows a diagrammatic view of a portion of black and white film with a filter overlaying it illustrating the manner in which color information is coded onto the black and white film.
FIG. 3 shows a diagrammatic view illustrating the relative widths of the red, green and blue lines of the filter screen or film.

Reference is now made to FIG. 1 which shows a line screen or filter 20 suitable for use in this invention. In this view the width of each of the color lines of filter 20 has been deliberately enlarged so that they are visible. Normally, the number of color lines per inch will be of the order of 900 so that the filter 20 will appear to be gray or pink when viewed with a white light.

In FIG. 2 a filter 20 is diagrammatically shown adjacent a conventional strip of black and white film 22. As mentioned above, filter 20 is comprised of a plurality of sets of blue, green and red line filters contiguously disposed along the length of filter 20. When red light is directed onto one of the sets of filter 20, for example, the set associated with block 1 in FIG. 2, the red filter line or stripe allows transmission of the red light. Accordingly, on the film underneath the set of filter color lines designated as block 1, only the portion under red line 24 will be darkened by subsequent single development of the film. If the invention is employed with a type of film in which dark areas are produced by development only in regions where no light passes through the film, the film beneath blue and green lines would appear dark, and the portion beneath the red lines would be clear after a single development.

Similarly, in the portion of the film beneath the set of color lines designated as block 2 in FIG. 2, only the portion beneath the green line 26 darkens upon development when that block is subjected to yellow-green light as shown. In block 3, blue light causes the portion of the film beneath blue color line 28 to darken and in block 4, the portions of the film beneath green (line) stripe 30 and red (line) stripe 32 are darkened when yellow light is incident upon filter 20. In blocks 5–8, the effect of blue-green, red-violet, white and black light is illustrated.

When gray light is incident upon filter 20, as can be seen in block 9, the portions of the film beneath the blue, green and red color (lines) stripes are all partially darkened. Similarly, yellow-orange light causes a partial darkening of the portion of film 22 beneath green color line 34 and a complete darkening of the portion of the film beneath red color (line) stripe 36. White, yellow-orange light and brown light causes similar partially darkening of some portions of the film beneath certain color lines and full darkening beneath others. By a complete or partial covering of the film beneath one or more color lines, all color tones, with their darkened or lightened tints, can be formed on the film and this result permits a complete reproduction and recording of all colors of the spectrum.

Thus, light incident upon the photographic plate 22 is split up by line filter 20 into three parts and the deposits under the same on the black and white photographic plate 22 represent the red, green and blue parts of the incident image. If the film thus exposed is developed, fixed and placed in contact with a similarly colored plate so that the red, blue and green (lines) stripes fall in the same places, a negative or complementary colored picture results. If, however, a positive transparency from this negative is made by printing and then covered with the linear colored plate, a positive picture in the true colors of the original will be formed. The opaque parts in the negative are now transparent and, therefore, colored and the quantity or brilliancy of the colors is a function of the deposited material on the negative. However, as pointed out above, overlying the developed film exactly with the original filter is difficult and seldom can be satisfactorily accomplished in practice.

Reference is now made to FIG. 3 which shows the relative widths of the three-color lines which comprise each of the sets of the screen filter which are imposed upon the black and white film. As shown, the blue color (line) stripe preferably comprises roughly 25 percent of the set width and the green and red (lines) stripes 35 percent and 40 percent, respectively. From colorimetric analysis it is known that most blue filters transmit with a greater intensity and that blue records on most films with a greater intensity than red. Similarly, green transmits and records with an intensity which is less than blue but greater than red. Accordingly, it is desirable that the relative division of each of the sets into the three color (lines) stripes should take advantage of this differing intensity so that the specific widths can compensate for color transmission variance and at the same time use this width variance for detecting the locations of each color (line) stripe. It has been determined that a division whereby the red (line) stripe comprises 40 percent of the total set width, the green (line) stripe 35 percent and the blue (line) stripe 25 percent is particularly satisfactory, although other widths can, of course, be employed and utilized to detect each color (line) stripe.

Reference is now made to FIG. 4 which shows one embodiment of the invention for deriving color coded information from a piece of film 40 which has been produced and developed as indicated above, and which has color coded sets of blue, green and red (lines) stripes each having a different width and preferably having the width division depicted in FIG. 3. In this embodiment, a conventional flying spot scanner 42, which may include a cathode ray tube, sequentially scans areas across developed film 40. Preferably, scanner 42 scans all the discrete areas along a horizontal line on film 40 and then shifts vertically to repeat the horizontal scan along a parallel line.

The detected light at each scanned location which is reflected from film 40, or detected as passing through film 40, is transmitted by any suitable means to two conventional photomultipliers 44 and 46 which each produce an electrical signal which has a characteristic, for example, photomultiplier 44 detects amplitude, which varies with the intensity of the incident light. Photomultiplier 46 detects the line widths and feeds comparator 48. Since the intensity in contiguous blue, green and red color lines or stripes of a single or adjoining set is normally quite different, the width of a line being scanned can be easily ascertained from the electrical signal. Moreover, since the color (lines) stripes are always ordered in each set of the same fashion, the color of the next (line) stripe to be scanned can always be ascertained by comparator 48 from the width of the (line) stripe just scanned or from the width of any previously scanned (line) stripe. Comparator 48 compares the stripes with each other on the time axis. Further, comparator 48 preferably contains a memory for retaining position when black and white information is being scanned. The function of determining the color associated with the (line) stripe being scanned is carried out by comparator 48 and suitable circuitry for accomplishing this function will be apparent to anyone of ordinary skill in the art.

Comparator 48 thus produces a signal on output line 50 which indicates the color of the (line) stripe which is currently being scanned. The electrical signal produced by photomultiplier 44 which indicates the intensity of the incident light as derived from the scan across the width of the (line) stripe is conveyed to matrix circuitry 52 from photomultiplier 44 and matrix circuit 52 in turn produces a signal which is transmitted to red electron gun 56, blue electron gun 58 or green electron gun 60 in accordance with the color (line) stripe which comparator 48 indicates is currently being scanned, and which causes the chosen gun to produce a beam of the proper intensity. The electron guns 56, 58 and 60 can then be employed to produce a color picture, for example, on a conventional color television, which will be a true color reproduction of the pattern coded onto black and white film 40. Each color density as scanned is thus fed to its matching electron beam, where the three beams are combined by a color television tube to produce a full color image of the scanned black and white film.

FIG. 5 illustrates another embodiment of the invention similar to that of FIG. 4. In this embodiment, for example, which might be suitable for reproducing a movie or the like on a theater screen, a three-color laser 62 is employed as a light source for the system. Laser 62 is of a type which is well known and which is capable of producing pulses of red, blue or green light. The light from laser 62 is scanned across film 64 in the same manner as scanner 42 scans film 40 as described above. A portion of the light passing through film 64 is transmitted via a conventional optical divide 66, for example, a half-silvered mirror, to a photomultiplier or other similar divide 68 which produces an electrical signal having a characteristic which varies with the intensity of the scanned beam. Alternately the (photomultiplier) photomultipliers 44 and 46 can be disposed behind film 64 to detect the light passing through film 64. As in the embodiment of FIG. 4, the electrical signal produced by photomultiplier 68 is passed to comparator 70 which determines the color of the (line) stripe which is currently being scanned. As mentioned above, since the three-color lines which comprise each set are always ordered in the same fashion, it is a simple task for comparator 70 to predict the next color to be produced from a determination of the color of the last line to be scanned. The signal produced by comparator 70 is transmitted to a trigger circuit 72 which causes laser 62 to produce a pulse of the proper color for passage through the color line currently being scanned. A portion of the light passing through the film 64 is also projected via suitable optics 74 onto a screen 76 where it can be viewed.

Figure 6:
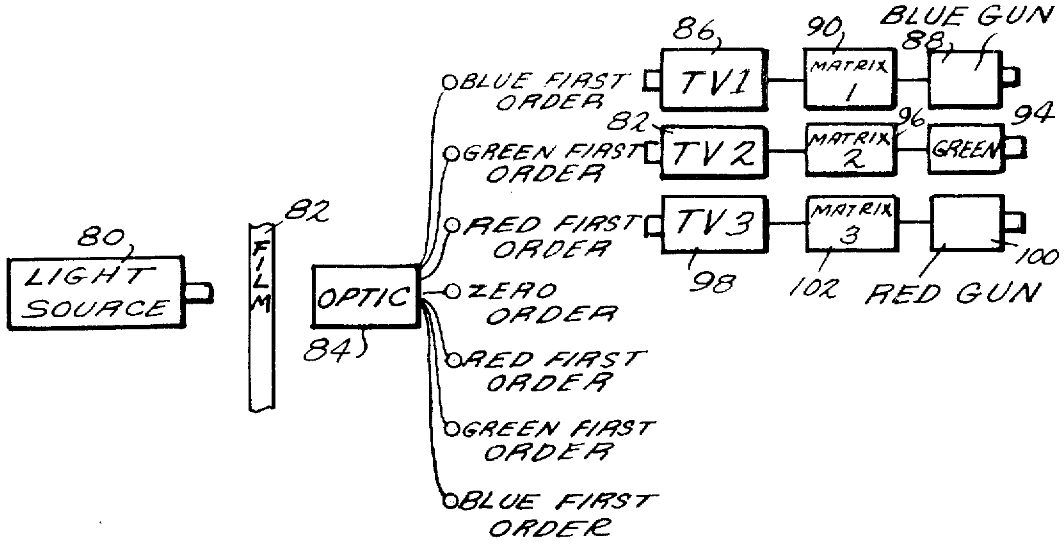
FIG. 6 shows a further embodiment of the invention for producing a diffraction pattern from the color coded pattern on the film and generating a reproduction of the pattern from the diffraction pattern.

FIG. 6 illustrates another embodiment of the invention whereby Fourier transform techniques are utilized for reproducing line screen black and white films in color. In the embodiment illustrated in FIG. 6, a light source 80 produces a beam which is transmitted through film 82, which is the type discussed above. The resultant image passes through suitable optical devices 84 to produce a diffraction pattern as shown. In terms of a Fourier transform, the diffraction patterns produced by lines of three different widths on a line screen black and white film appear at differnt locations in space because of the differing widths of the color lines. As shown in FIG. 6, the distances between the zero order image and the red, green and blue first order images are proportional to the special frequency of lines in the line screen pattern which bears the color information.

The first order diffraction corresponds to the fundamental frequency of the Fourier series which can be used to represent the lines of the line screen. The wave length of this fundamental frequency is equal to the distance between the lines of the line screen image. Reducing the line spacing causes the two first order images to be spaced further apart. Thus if the line spacings representing the color information of the three primary colors are of different widths, they will produce a Fourier transform first order diffraction patterns each separated from the other in a vertical pattern. Second, third and further orders of the image, of course, will be produced, but these are not normally useful.

If a different television vidicon tube or other similar device is disposed adjacent the location where the three first images respectively appear, and individual lenses utilized to focus each of the first order images into the separate vidicon tubes, a Fourier transform image of the Fourier transform will be produced on the face of each vidicon and the electrical signal produced by each can be employed to operate red, green and blue electron tubes or the like. In FIG. 6, vidicon tube 86 is disposed adjacent the blue first order image and produces a signal which operates blue electron gun 88 via matrix 90. Similarly, vidicon tube 92 is disposed adjacent the green first order images and operates electron tube 94 via matrix 96. Vidicon tube 98 is mounted adjacent the location at which the red first order image appears and operates the red electron gun 100 via matrix 102.

Thus, for home color television reception, the three-color diffraction pattern of the Fourier transform is imaged into three vidicon tubes which produce signals which in turn are fed to matrixing circuits, and then to each of the color producing electron beams where the modulated beam produce a complete color image on the face of a color cathode ray tube.

Figure 7:
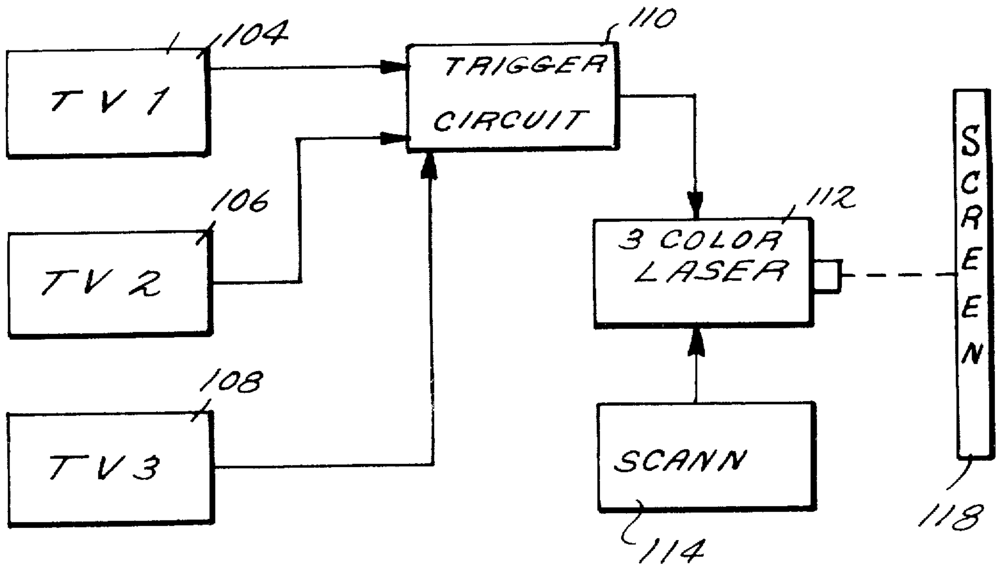
FIG. 7 shows a modification of the embodiment of FIG. 6 for reproducing a color coded pattern on black and white film using a three-color pulsed laser.

FIG. 7 illustrates another embodiment of the invention similar to that of FIG. 6 in which television cameras 104, 106 and 108 are disposed adjacent the locations at which the blue, red and green first order images, respectively, appear. The image is preferably scanned by a laser flying spot scanner and the resultant three-color images are fed to three vidicon tubes. The output of each of these three vidicons is applied to a trigger circuit 110 which recognized the vidicon tube which is applying a signal to circuit 110 and activates the associated color in the three-color laser 112, and also varies the intensity of the light produced by laser 112 in accordance with the intensity of the signals produced by vidicons 104, 106 and 108, respectively. A scanning mechanism 114 causes laser 112 to scan across the screen 118 and produce a color signal in the same manner discussed above.

Thus, each color separation point of the diffraction pattern is imaged upon a camera or photomultiplier tube of the appropriate primary color to produce signals which are fed to the pulse triggering circuit so that the proper laser color is projected in accordance with the modulation produced by the Fourier transform diffraction pattern.

Figure 8:
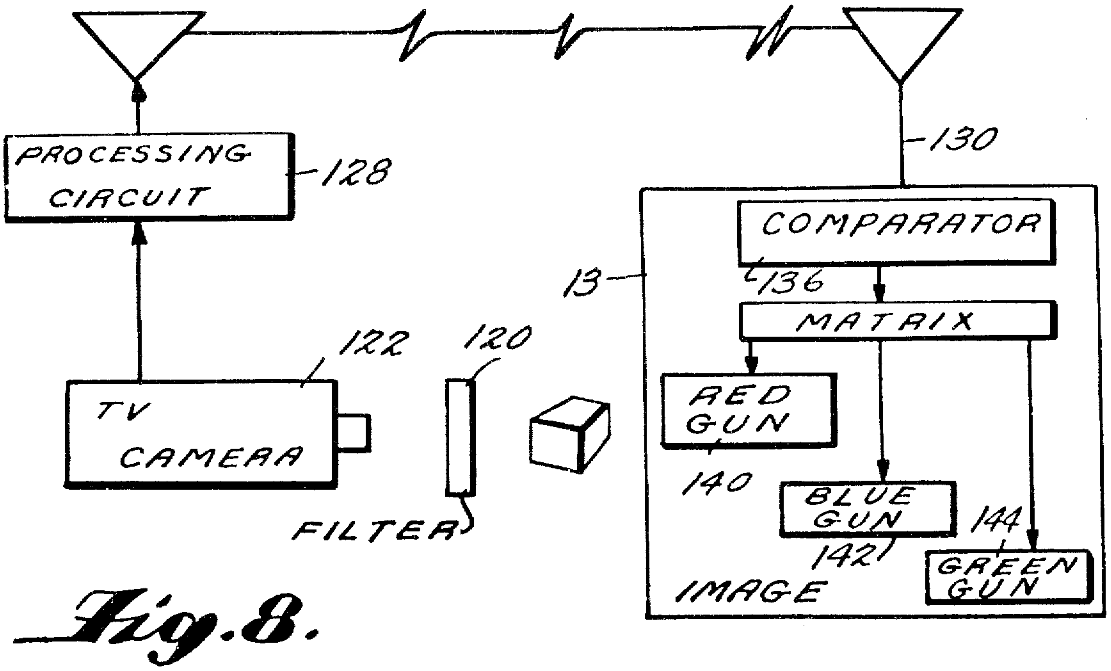
FIG. 8 shows a further embodiment for coding a color image prior scanning by a television vidicon or similar device for transmission and decoding at a receiver.

Reference is now made to FIG. 8 which shows in block diagram a color transmission system in which the color information is coded as described above by mounting a line screen filter 120, as shown in FIG. 1, between a conventional television camera 122 and the image to be transmitted. Thus, camera 122 produces a black and white video signal with the color information coded thereon. This information is then transmitted via a conventional antenna 126, after conventional processing in circuit 128, to any of a number of remote stations which each might include a conventional television receiver. The black and white video signal is received for example by antenna 130, and thus coupled into a standard color receiver 132 which has been modified to include a comparator 136 which functions in the same fashion as the comparator shown in FIG. 4, detecting the blue, green and red lines by their respective widths. The signal produced by comparator 136 is then used to operate electron guns 140, 142 and 144 to produce a color image. Thus in the same fashion described above each color is coded according to the width of the line signal associated with that color.

Figure 9:
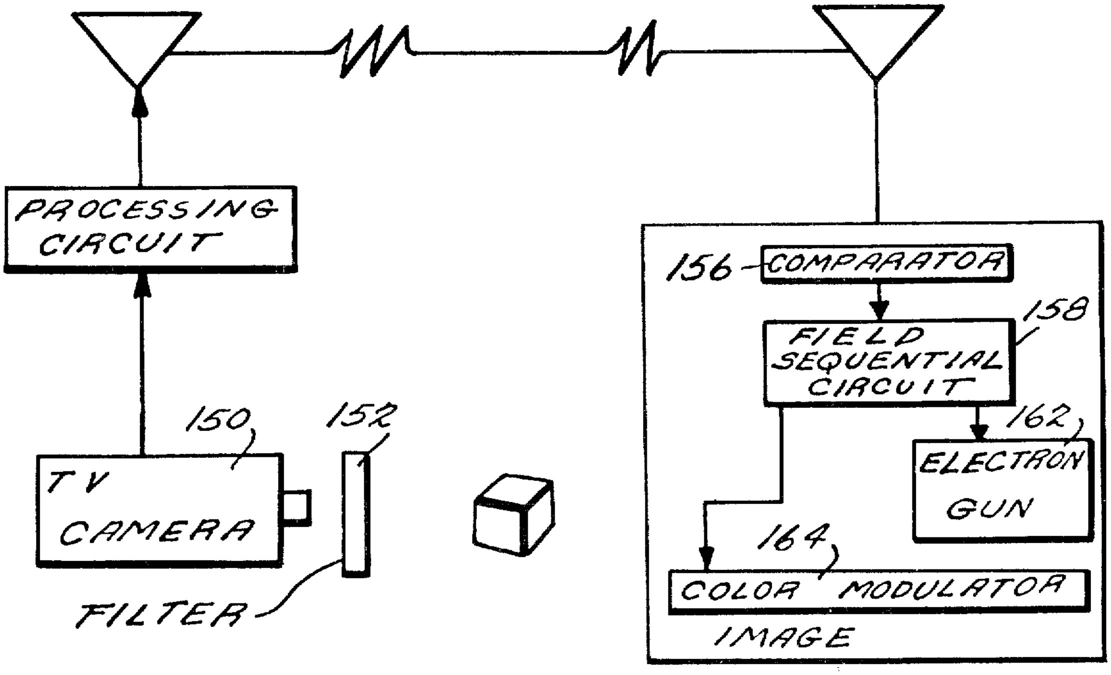
FIG. 9 shows another embodiment similar to that of FIG. 8.

FIG. 9 illustrates yet another embodiment similar to that in FIG. 8 in which the image received by camera 150 via a three-color filter 152 and transmitted to a television set 156 is received by a comparator 158 which separates the color signal and applies appropriate signals to a field sequential circuit 160. Circuit 160 operates electronic gun 162 to provide an image in black and white and also operates a color modulator 164 which produces a full color image from the black and white image. Any suitable color modulator can be used and U.S. Pat. Nos. 3,428,243 and 3,569,614 disclose suitable modulators. The disclosure of these patents are explicitly imcorporated herewith by reference.

The above color transmission system can be used in any number of systems including television production systems, closed circuit television systems, facsimile electronic photography and the graphic arts. The primary advantage is that standard black and white television equipment can be very simply modified by this technique to transmit live color productions, color motion pictures and video tape without special color synchronization circuits or equipment.

Figure 10:
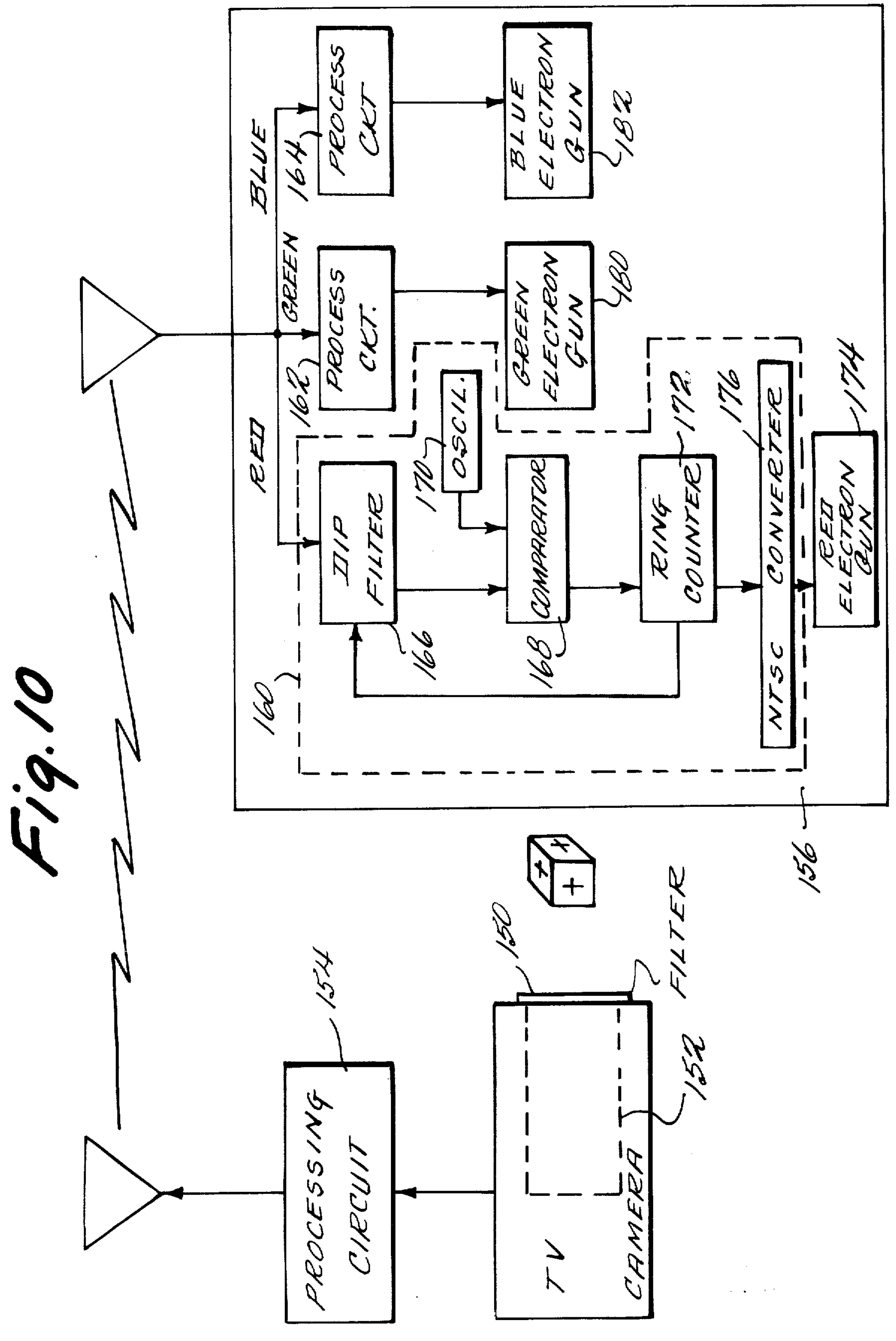
FIG. 10 shows another embodiment similar to that of FIG. 8.

FIG. 10 illustrates another similar embodiment in which color information is obtained by mounting a line screen filter 150 vertical in relation to the horizontal scan of a pick-up tube 152, such as a vidicon, for a conventional black and white television camera or the like so that the filter is in focus on the image pick-up surface of tube 150 to minimize distortion. This can normally be ensured by mounting filter 150 in intimate contact with the surface. As in the embodiment of FIGS. 8 and 9, the resulting signal is conventionally processed by circuit 154 and transmitted to a plurality of receivers. Receiver 156 typifies one such receiver.

The received signal is applied to three-processing circuits 160, 162 and 164 which break apart the colors. Circuit 160 is shown in detail and circuits 162 and 164 are similar. The input to circuit 160 is first applied to a conventional dip filter circuit or selective filter 166 which recognizes the coded frequency of the red information. The output of filter 166 is applied to a comparator circuit 168 together with the output of a local oscillator 170 and the output of circuit 168 applied to a ring counter 172 which stores the information while it is being converted to a format suitable for controlling gun 174 by converter 176. The components in circuit 160 are conventional items. Circuits 162 and 164 similarly control electron guns 180 and 182.

The above described embodiment of the invention are suitable for reproducing still pictures, motion pictures, computer outputs and color video recordings, as well as other applications. In short, any color coded pattern may be recorded or transferred to a relatively inexpensive black and white film and all of the color information thereon programmed easily and simply retrieved and employed to generate a satisfactory reproduction, or color television images may be picked up and transmitted over conventional black and white television systems and then converted to a full color image on standard color receivers.

Many changes and modifications in the above described embodiments of the invention are, of course, possible without departing from the scope of the invention. Accordingly, that scope is intended to be limited only by the scope of the appended claims.

What is claimed is:

1. Apparatus for transmitting a color coded image comprising:

a television camera having a pick-up tube for receiving a scene image and producing a video output signal and a three color filter mounted vertically relative to the horizontal scan of the tube so that the filter is in focus on the image pick-up surface of the tube and having a plurality of contiguous rectangular regions, each region including three and only three non-white portions, the portions in each region being contiguous and in a fixed order, and each region including a red responsive portion with a length extending the length of said filter and a first width, a blue responsive rectangular portion with a length extending the length of said filter and a second width differing from said first width and a green responsive rectangular portion with a length extending the length of said filter and a third width differing from said first and second widths, and disposed between said image and said video input so that said camera produces a color coded video output signal.

2. Apparatus as in claim 1 wherein the ratio of said width of said first portion to said width of said second portion to said width of said third portion is roughly 40:35:25.

3. A method of coding a color image comprising the steps of:

mounting adjacent said image a three color filter having a plurality of contiguous rectangular regions, each region including three and only three non-white portions, the portions in each region being contiguous and in a fixed order, and each region including a red responsive rectangular portion with a length extending the length of said filter and a first width, a blue responsive rectangular portion with a length extending the length of said filter and a second width differing from said first width, and a green responsive rectangular portion with a length extending the length of said filter and a third width differing from said first and second widths, and applying said color image to said filter so that each part of said image adjacent one of said red responsive portions codes information as to the red component of the image incident on that red responsive portion, each part of said film adjacent one of said blue responsive portions codes information as to the blue component of the image incident on that blue responsive portion and each part of said film adjacent one of said green responsive portion codes information as to the green component of the image incident on that green responsive action.

4. A color coded image transmission system comprising:

a television camera having a pick-up tube for receiving a scene image and producing a video output signal, a three color filter mounted with rectangular color regions vertical relative to the horizontal scan of the tube so that the filter is in focus on the image pick-up surface of the tube and having a plurality of contiguous rectangular regions, each region including three and only three non-white portions, the portions in each region being contiguous and in a fixed order and each region including a red responsive portion with a length extending the length of said filter and a first width, a blue resonsive rectangular portion with a length extending the length of said filter and a second width differing from said first width and a green responsive rectangular portion with a length extending the length of said filter and a third width differing from said first and second widths and disposed between said image and said video input so that said camera produces a color coded video output signal means for transmitting said video output signal to a plurality of remote stations, means at each of said stations for receiving said video signal and reproducing a color image.

5. A system as in claim 4 wherein said receiving and reproducing means includes means for determining the portions of the video signal derived from a scene image portion passing through red responsive portions and means for producing a red color image in response to said red portions, means for determining the portions of the video signal derived from a scene image portion passing through blue responsive portions and means for producing a blue color image in response to said blue portions, means for determining the portions of the video signal derived from a scene image portion passing through green responsive portions and means for producing a green color image in response to said green portions.

6. A system as in claim 4 wherein said receiving and reproducing means includes means for determining the portions of the video signal derived from a scene image passing through said red, blue and green responsive portions respectively, means for producing an electron beam and a color modulator disposed in the path of said beam and connected to said determining means for producing a color image.

* * * * *